US010895404B2

(12) United States Patent
Chaudhry

(10) Patent No.: US 10,895,404 B2
(45) Date of Patent: Jan. 19, 2021

(54) CONDENSATION REDUCTION IN WATER HEATERS

(71) Applicant: Rheem Manufacturing Company, Atlanta, GA (US)

(72) Inventor: Raheel A. Chaudhry, Montgomery, AL (US)

(73) Assignee: Rheem Manufacturing Company, Atlanta, GA (US)

( * ) Notice: Subject to any disclaimer, the term of this patent is extended or adjusted under 35 U.S.C. 154(b) by 240 days.

(21) Appl. No.: 15/919,796

(22) Filed: Mar. 13, 2018

(65) Prior Publication Data

US 2019/0285315 A1 Sep. 19, 2019

(51) Int. Cl.
*F24H 9/20* (2006.01)
*F24H 9/00* (2006.01)
*F24H 8/00* (2006.01)
*F24H 1/20* (2006.01)
*G05D 23/19* (2006.01)

(52) U.S. Cl.
CPC ........... *F24H 9/2035* (2013.01); *F24H 1/208* (2013.01); *F24H 8/00* (2013.01); *F24H 9/0042* (2013.01); *G05D 23/19* (2013.01); *F24H 1/206* (2013.01); *Y02B 30/00* (2013.01)

(58) Field of Classification Search
CPC . F24H 1/206; F24H 1/208; F24H 8/00; F24H 9/0042; F24H 9/2035; G05D 23/19; Y02B 30/00
USPC .......................................... 122/14.21, 18.31
See application file for complete search history.

(56) References Cited

U.S. PATENT DOCUMENTS

| 4,852,524 A | 8/1989 | Cohen |
| 8,807,093 B2 | 8/2014 | Steinhafel |
| 9,097,436 B1* | 8/2015 | Smelcer .................... F24H 1/28 |
| 2018/0224156 A1* | 8/2018 | Steinhafel ............. F24H 9/2035 |

FOREIGN PATENT DOCUMENTS

KR 101592264 2/2016

OTHER PUBLICATIONS

International Search Report for PCT/US2019/015897 dated May 7, 2019.

* cited by examiner

*Primary Examiner* — Steven B McAllister
*Assistant Examiner* — Benjamin W Johnson
(74) *Attorney, Agent, or Firm* — Troutman Pepper Hamilton Sanders LLP

(57) ABSTRACT

A water heater can include a tank. The water heater can also include a heat exchanger that includes multiple flue tube segments disposed within the tank, where the flue tube segments include a thermally-conductive material. The heat exchanger can further include a heating system that heats a fluid to create a heated fluid, where the heating system further circulates the heated fluid through the flue tube segments, where the flue tube segments absorb thermal energy from the heated fluid and subsequently dissipate the thermal energy into the tank to convert the unheated water to the heated water. The water heater can also include a controller coupled to the heating system, where the controller operates the heating system outside of a normal heating cycle when the controller determines that condensation has accumulated in the flue tube segments, where operating the heating system outside of the normal heating cycle removes the condensation.

9 Claims, 7 Drawing Sheets

CONDENSATION REDUCTION IN WATER HEATERS

TECHNICAL FIELD

The present disclosure relates generally to water heaters, and more particularly to systems, methods, and devices for reducing condensation in water heaters.

BACKGROUND

Water heaters are generally used to provide a supply of hot water. Water heaters can be used in a number of different residential, commercial, and industrial applications. A water heater can supply hot water to a number of different processes. Water heaters can be used for residential and commercial uses. Some water heaters, particularly high-efficiency water heaters, have additional components and/or more complicated processes. In such cases, there are a number of issues that can arise. For example, a high-efficiency hot water heater can develop a build-up of condensation. In such a case, the condensation can accumulate to block the heat exchanger, causing the gas water heater to lose efficiency or, in extreme cases, stop operating.

SUMMARY

In general, in one aspect, the disclosure relates to a water heater that includes a tank and a water inlet line that delivers unheated water to the tank. The water heater can also include a water outlet line that draws heated water from the tank for a hot water demand. The water heater can further include a heat exchanger that includes multiple flue tube segments disposed within the tank, where the flue tube segments are made of a thermally-conductive material. The water heater can also include a heating system that heats a fluid to create a heated fluid, where the heating system further circulates the heated fluid through the heat exchanger, where the flue tube segments of the heat exchanger absorb thermal energy from the heated fluid and subsequently dissipate the thermal energy into the tank to convert the unheated water to the heated water. The water heater can further include a controller coupled to the heating system, where the controller operates the heating system outside of a normal heating cycle when the controller determines that condensation has accumulated in the heat exchanger, where operating the heating system outside of the normal heating cycle reduces the condensation.

In another aspect, the disclosure can generally relate to a controller used to reduce condensation in a water heater. The controller can include a control engine that is configured to receive a temperature measurement of water within a tank of the water heater. The control engine can also be configured to determine, using the temperature measurement, whether the condensation is present within a heat exchanger of the water heater. The control engine can further be configured to operate a heating system outside of a normal heating cycle when the controller determines that the condensation is present within the heat exchanger, where operating the heating system outside of the normal heating cycle removes at least some of the condensation from the heat exchanger.

In yet another aspect, the disclosure can generally relate to a non-transitory computer-readable medium comprising instructions that, when executed by a hardware processor, perform a method for removing condensation from a heat exchanger of a water heater. The method can include receiving, from a temperature sensor, a temperature measurement of water in a tank of the water heater. The method can include determining, using the temperature measurement, whether condensation is present in a heat exchanger of the water heater. The method can further include operating, in response to determining that the condensation is present in the heat exchanger, a heating system outside of a normal heating cycle, where operating the heating system outside of the normal heating cycle removes at least some of the condensation from the heat exchanger.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION

Figure 1:
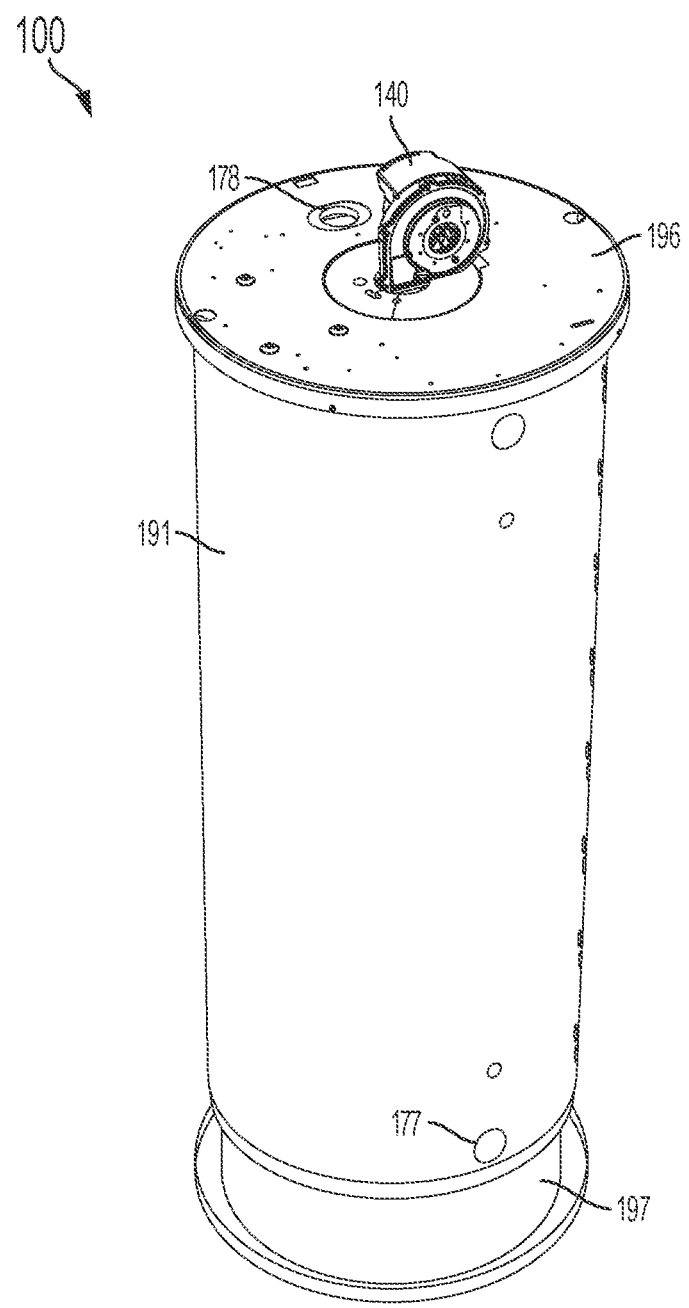
FIG. 1 shows a perspective view of an example water heater in which condensation can accumulate.

In general, example embodiments provide systems, methods, and devices for reducing condensation in water heaters. Example embodiments can be used for any size (e.g., capacity) of water heater. Further, example embodiments can be located in any type of environment (e.g., warehouse, attic, garage, storage, mechanical room, basement) for any type (e.g., commercial, residential, industrial) of user. Example water heaters can be used for one or more of any number of processes (e.g., automatic clothes washers, automatic dishwashers, showers, sink faucets, heating systems, humidifiers). Example water heaters can be used in commercial and/or residential applications.

While example embodiments are directed to high-efficiency gas water heaters (e.g., water heaters having an efficiency of at least 90%), example embodiments can also apply to water heaters having lower efficiencies (e.g., 80%). Further, example embodiments can apply to water heaters having any of a number of components and/or configurations. Therefore, the components and configurations of water heaters shown and described herein are meant merely to be non-limiting examples of water heaters that can have reduced condensation using example embodiments.

Water heater systems (or components thereof, including controllers) described herein can be made of one or more of a number of suitable materials to allow that device and/or other associated components of a system to meet certain standards and/or regulations while also maintaining durability in light of the one or more conditions under which the devices and/or other associated components of the system can be exposed. Examples of such materials can include, but are not limited to, aluminum, stainless steel, copper, fiberglass, glass, plastic, PVC, ceramic, and rubber.

Components of a water heater system (or portions thereof) described herein can be made from a single piece (as from a mold, injection mold, die cast, or extrusion process). In addition, or in the alternative, components of a water heater system (or portions thereof) can be made from multiple pieces that are mechanically coupled to each other. In such a case, the multiple pieces can be mechanically coupled to each other using one or more of a number of coupling methods, including but not limited to epoxy, welding, soldering, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

In the foregoing figures showing example embodiments for reducing condensation in gas water heaters, one or more of the components shown may be omitted, repeated, and/or substituted. Accordingly, example embodiments for reducing condensation in water heaters should not be considered limited to the specific arrangements of components shown in any of the figures. For example, features shown in one or more figures or described with respect to one embodiment can be applied to another embodiment associated with a different figure or description.

In addition, if a component of a figure is described but not expressly shown or labeled in that figure, the label used for a corresponding component in another figure can be inferred to that component. Conversely, if a component in a figure is labeled but not described, the description for such component can be substantially the same as the description for a corresponding component in another figure. Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein. The numbering scheme for the various components in the figures herein is such that each component is a three digit number, and corresponding components in other figures have the identical last two digits.

In some cases, example embodiments can be subject to meeting certain standards and/or requirements. Examples of entities that set and/or maintain standards include, but are not limited to, the Department of Energy (DOE), the National Electric Code (NEC), the National Electrical Manufacturers Association (NEMA), the International Electrotechnical Commission (IEC), the American Society of Mechanical Engineers (ASME), the National Fire Protection Association (NFPA), the American Society of Heating, Refrigeration and Air Conditioning Engineers (ASHRAE), Underwriters' Laboratories (UL), and the Institute of Electrical and Electronics Engineers (IEEE). Use of example embodiments described herein meet (and/or allow a corresponding water heater system or portion thereof to meet) such standards when required.

Example embodiments for reducing condensation in water heaters will be described more fully hereinafter with reference to the accompanying drawings, in which example embodiments for reducing condensation in water heaters are shown. Reducing condensation in water heaters may, however, be embodied in many different forms and should not be construed as limited to the example embodiments set forth herein. Rather, these example embodiments are provided so that this disclosure will be thorough and complete, and will fully convey the scope of reducing condensation in water heaters to those of ordinary skill in the art. Like, but not necessarily the same, elements (also sometimes called components) in the various figures are denoted by like reference numerals for consistency.

Terms such as "first", "second", "third", "height", "top", "bottom", "side", and "within" are used merely to distinguish one component (or part of a component or state of a component) from another. Such terms are not meant to denote a preference or a particular orientation, and are not meant to limit embodiments of reducing condensation in water heaters. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 2:
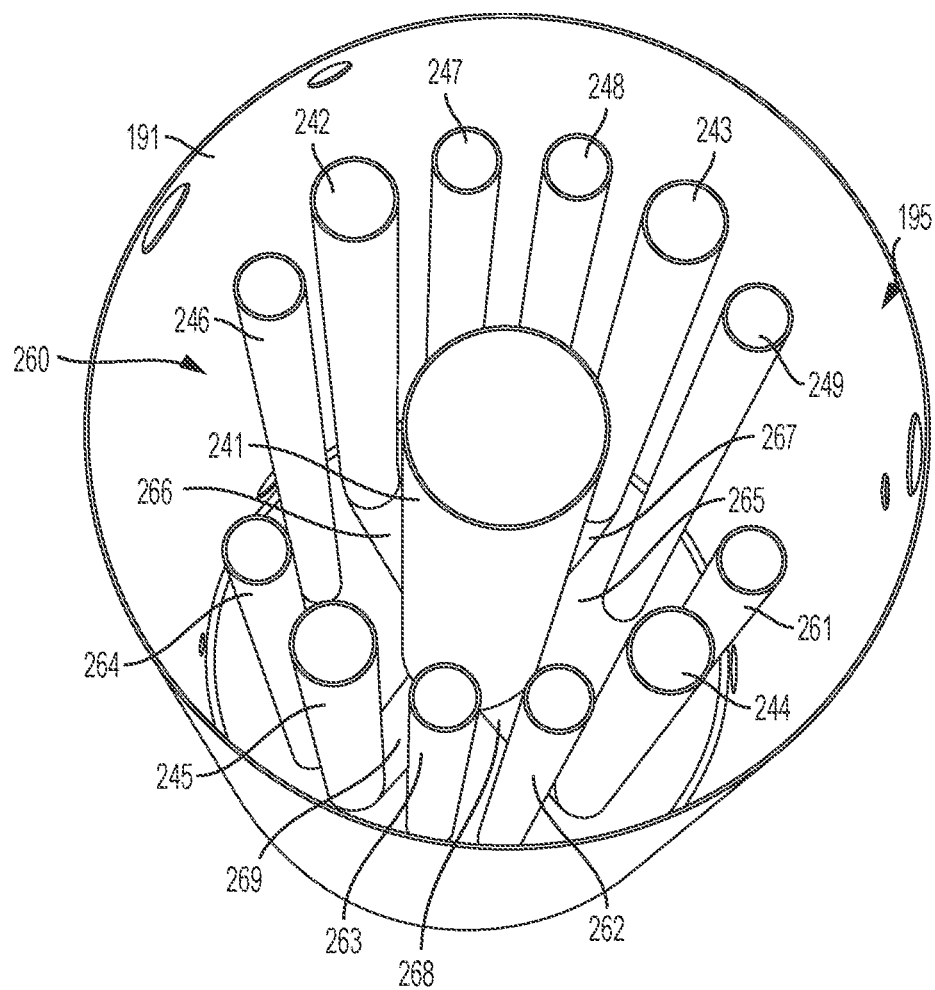
FIG. 2 shows a top view of the inside of the water tank of the water heater of FIG. 1.
Figure 3:
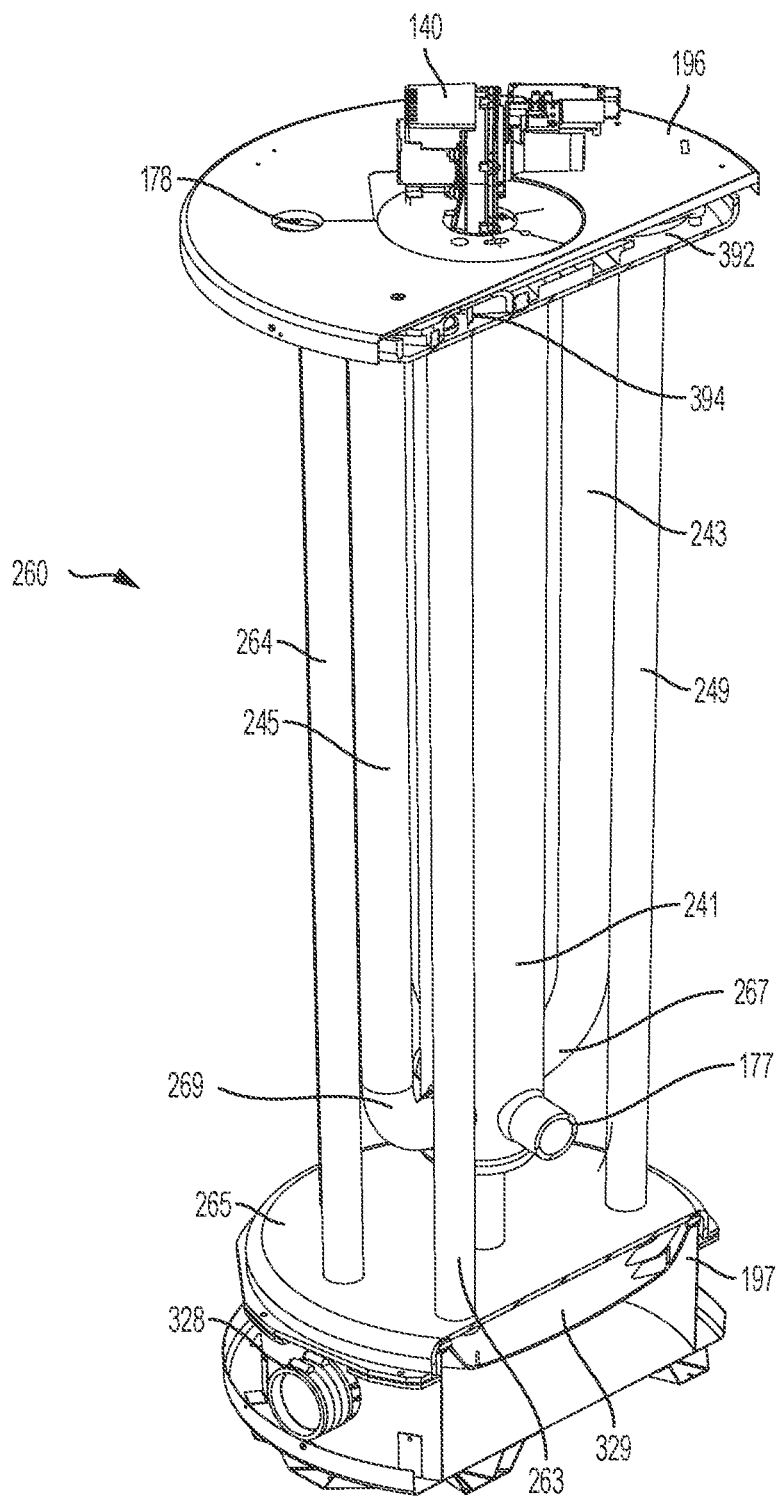
FIG. 3 shows a cross-sectional view of the water heater of FIG. 1 without the wall that defines the water tank.

FIG. 1 shows a perspective view of an example water heater 100 in which condensation can accumulate. FIG. 2 shows a top view of the inside of the water tank 195 of the water heater 100 of FIG. 1. FIG. 3 shows a cross-sectional view of the water heater 100 of FIG. 1 without the wall 191 that defines the water tank 195. Referring to FIGS. 1-3, the water heater 100 in this case includes water tank 195 that is defined by one or more walls 191, a top cover assembly 196, and a bottom assembly 197. The example water heater 100 also includes a heating system 140 (also sometimes called a combustion system 140) at the top end of the water heater 100. For example, the heating system 140 may include a down-fired burner, where hot gas flows downward into a multi-pass heat exchanger 260 disposed in the water tank 195. The water heater 100 in this case also includes a water inlet 177 (also called an inlet fitting 177) that may be disposed, for example, closer to the bottom end of the water tank 195. The example water tank 195 also includes a top water outlet 178 (also called an outlet fitting 178) that traverses the top cover assembly 196.

The multi-pass heat exchanger 260 of FIGS. 1-3 is one example of a number of different heat exchangers that can be used to heat water within the water tank 195 of the water heater 100. The multi-pass heat exchanger 260 positioned in the water tank 195 in this example includes one or more first pass tube segments (in this case, one first-pass flue tube segment 241), one or more second-pass flue tube segments (in this case, second-pass flue tube segments 242, 243, 244, 245), and one or more third-pass flue tube segments (in this case, third-pass flue tube segments 246, 247, 248, 249, 261, 262, 263, 264). All of these flue tube segments are interconnected with each other to form a continuous tube string in a branch configuration, where the first-pass flue tube segment 241 is the base, the second-pass flue tube segments 242-245 branch out from the first-pass flue tube segment 241, and the third-pass flue tube segments 246-249 and 261-264 each branch out from one of the second-pass flue tube segments 242-245. In some cases, the multi-pass heat exchanger 260 can have only two passes, or more than 3 passes.

In some cases, the top cover assembly 196 includes top flues that interface with one or more passes of the multi-pass heat exchanger 260. For example, in this case, the top cover assembly 196 includes top flues that interface with second-pass flue tubes 242, 243, 244, 245 and third-pass flue tubes 246, 247, 248, 249, 261, 262, 263, 264 of the multi-pass heat exchanger 260. The multi-pass heat exchanger 260 in this case has a configuration that allows the location of the water outlet 178 in the top cover assembly 196 at the top end of the water heater 100. The bottom assembly 197 may also include a bottom flue that interfaces with the third-pass flue tubes 246, 247, 248, 249, 261, 262, 263, 264 of the multi-pass heat exchanger 260, where the hot gas exits the water heater 100 through a hot gas outlet in the bottom assembly 197.

Similarly, one or more flue tube segments can be used to connect flue tube segments of one pass to flue tube segments of another pass of the multi-pass heat exchanger 260. For example, in this case, flue tube segment 266 is used to connect second-pass flue tube segment 242 to first-pass flue tube segment 241. Flue tube segment 267 is used to connect second-pass flue tube segment 243 to first-pass flue tube segment 241. Flue tube segment 268 is used to connect second-pass flue tube segment 244 to first-pass flue tube segment 241. Flue tube segment 269 is used to connect second-pass flue tube segment 245 to first-pass flue tube segment 241. Flue tube segments 266-269 are disposed toward the bottom of the water tank 195 in this example.

During operation of the water heater 100, unheated water enters the water tank 195 through the water inlet 177, and gas (e.g., natural gas, propane) is heated by the heating system 140. The unheated water gets heated inside the water tank 195 by heated fluid (e.g., natural gas, liquid propane) flowing through the multi-pass heat exchanger 260. The heated fluid is generated and circulated through the multi-pass heat exchanger 260 by the heating system 140. The resulting heated water exits the water tank 195 through the top water outlet 178 in the top cover assembly 196. The heated fluid that flows through the multi-pass heat exchanger 260 may exit the water tank through a hot gas outlet in the bottom assembly 197.

The water heater 100 in this case provides a top-side water outlet 178 location along with the high efficiency of the multi-pass heat exchanger 260. The water inlet 177, the water outlet 178, the gas inlet, and the gas outlet may be at different locations than what is shown in FIGS. 1-3. In this example, the first-pass flue tube segment 241, the second-pass flue tube segments 242-245, and the third-pass flue tube segments 246-249 and 261-264 are all situated substantially parallel with each other within the tank 195. The heated fluid generated by the heating system 140 is directed down (down fired) through the first-pass flue tube segment 241. Once the heated fluid reaches the bottom of the first-pass flue tube segment, the heated fluid flows through flue tube segments 266-269 to reach the second pass-flue tube segments 242-245 and travel upward through the second pass-flue tube segments 242-245.

In some cases, the second-pass flue tube segments 242-245 may have curves or other variations in extending upward toward the top opening of the water tank 195. Top ends of the second-pass flue tube segments 242-245 may be terminated in top flues in the top cover assembly 196 of the water heater 100 or may otherwise be in fluid communication with the top flues in the top cover assembly 196 of the water heater 100. For example, second-pass flue tube segments 242 and 243 may be terminated in a first top plenum 392 within the top cover assembly 196, and second-pass flue tube segments 244 and 245 may be terminated in a second top plenum 394 within the top cover assembly 196.

In this example, the third-pass flue tube segments 246-249 and 261-264 are disposed in the water tank 195, extending from the top end of the water tank 195 to the bottom end of the water tank 195. Top end openings of the third-pass flue tube segments 246-249 and 261-264 may be terminated or may otherwise be in fluid communication with the top plenums 392, 394 in the top cover assembly 196. Heated fluid from the second-pass flue tube segments 242-245 flows to the third-pass flue tube segments 246-249 and 261-264 through the top plenums 392, 394 in the top cover assembly 196. For example, the top end openings of the third-pass flue tube segments 246-249 may be terminated in the first top plenum 392 to receive heated fluid from the second-pass flue tube segments 242 and 243, and the top end openings of the third-pass flue tube segments 261-264 may be terminated in the second top plenum 394 to receive heated fluid from the second-pass flue tube segments 244 and 245.

The bottom end openings of the third-pass flue tube segments 246-249 and 261-264 in this example are terminated in the bottom assembly 197 through openings in a top cover 265 of the bottom assembly 197. For example, the bottom assembly 197 may include a bottom flue 329, and heated fluid flowing through the third-pass flue tube segments 246-249 and 261-264 may flow to the bottom flue 329 and exit the bottom assembly 197 through a heated fluid outlet 328 of the bottom assembly 197.

The first-pass flue tube segment 241, the second-pass flue tube segments 242, 243, 244, 245, and the third-pass flue tube segments 246-249 and 261-264 may be configured with respect to each other to allow for placing the hot water outlet 178 in the top cover assembly 196 of the water heater 100, as shown in FIGS. 1-3. For example, the second-pass flue tube segments 242-245 may be intermingled with the third-pass flue tube segments 246-249 and 261-264 around the first-pass flue tube segment 241. The second-pass flue tube segments 242 and 243 are less than ninety degrees apart from each other, and the second-pass flue tube segments 244 and 245 are less than ninety degrees apart from each other. Further, the second-pass flue tube segments 242 and 243 are each greater than 90 degrees apart from the second-pass flue tube segments 244 and 245. Each second-pass flue tube segment 242-245 is also flanked by one of the third-pass flue tube segments 246-249 and 261-264, where two of the third-pass flue tube segments 246-249 and 261-264 are interspersed between two of the second-pass flue tube segments 242-245.

In general, the third-pass flue tube segments 246-249 and 261-264 are each spaced from an adjacent one of the second-pass flue tube segments 242-245 by the same circumferential distance with respect to the first-pass flue tube segment 241. As such, compared to third-pass flue tube segments 246-249 and 261-264 that are between second-pass flue tube segments 242-245 separated by less than ninety degrees, extra space exists between third-pass flue tube segments 246-249 and 261-264 that are between second-pass flue tube segments 242-245 separated by more than ninety degrees. To illustrate, the separation between the third-pass flue tube segments 246 and 264 is larger than the separation between the third-pass flue tube segments 247 and 248, which are between the second-pass flue tube segments 242 and 243 that are separated by less than ninety degrees. The separation between third-pass flue tube segments 249 and 261 is larger than the separation between the third-pass flue tube segments 262 and 263, which are between the second-pass flue tube segments 244 and 245 that are separated by less than ninety degrees. The extra spaces between the third-pass flue tube segments 246 and 264 and between the third-pass flue tube segments 249 and 261 allow the water heater 100 to have the top water outlet 178 without degrading the thermal efficiency of the water heater 195.

In some cases, the second-pass flue tube segments 242-245 and the third-pass flue tube segments 246-249 and 261-264 may be interspersed with respect to each other within the tank 195 in a different arrangement relative to what is shown in FIGS. 1-3. The flue tube segments of the multi-pass heat exchanger 260 may have different absolute and relative dimensions. The multi-pass heat exchanger 260 can include fewer or more flue tube segments than shown in FIGS. 1-3.

As the heated fluid passes through the multi-pass heat exchanger 260 and transfers heat from the heated fluid to the water in the tank 195 through the tube segments of the multi-pass heat exchanger 260, condensation can accumulate within the tube segments, particularly when the heating system 140 shuts down (e.g., cycles off) and is unable to generate enough heat to keep condensation from forming within the tube segments of the multi-pass heat exchanger 260. If enough condensation accumulates in the multi-pass heat exchanger 260, then the water can block a portion of the multi-pass heat exchanger 260, causing the heating system 140 to fail to operate. In other words, sufficient accumulation of condensation in a portion of the multi-pass heat exchanger 260 can cause the entire water heater 100 to fail. Example embodiments prevent this from occurring.

Figure 4A:
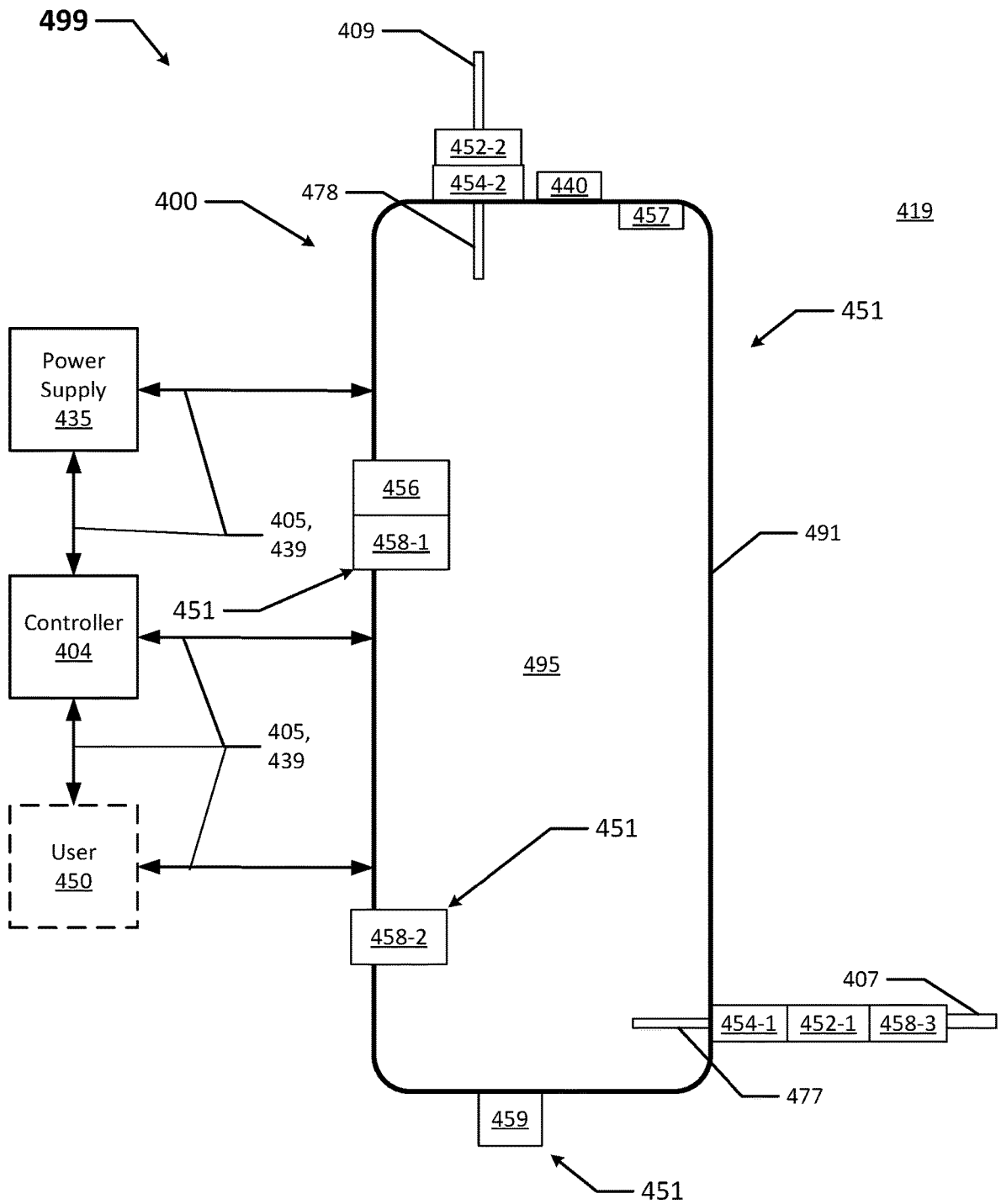
FIGS. 4A and 4B show diagrams of a system that includes a high-efficiency water heater in accordance with certain example embodiments.
Figure 4B:
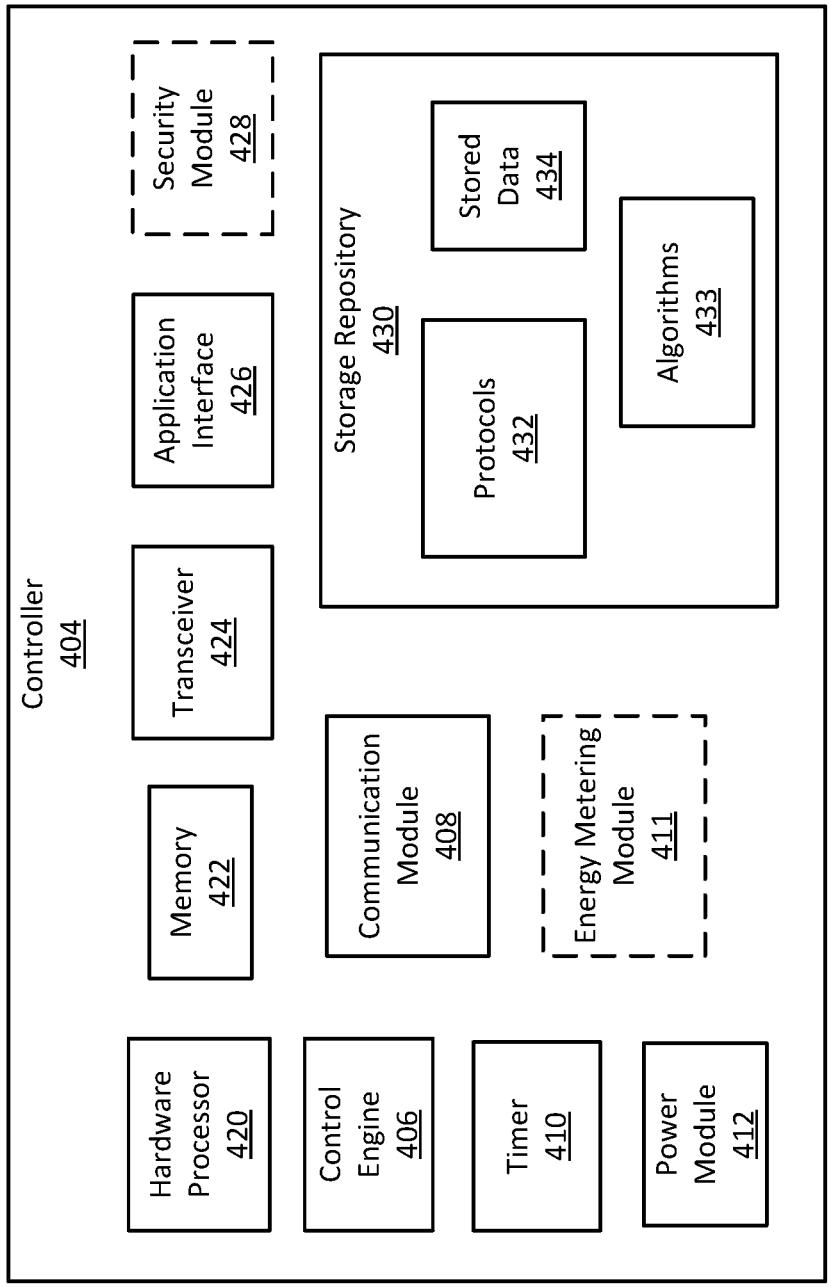

FIGS. 4A and 4B show diagrams of a water heating system 499 that includes a water heater 400 that is controlled by a controller 404 in accordance with certain example embodiments. Specifically, FIG. 4A shows the water heating system 499, and FIG. 4B shows a detailed system diagram of the controller 404. As shown in FIGS. 4A and 4B, the water heating system 499 can include the water heater 400, the controller 404, an inlet line 407, an outlet line 409, sensors 451, a power supply 435, and a user 450.

The water heater 400 (less the heat exchanger, such as multi-pass heat exchanger 260 of FIGS. 1-3) is shown in a cross-sectional side view in FIG. 4A and can include one or more sensor devices 451 (also sometimes called sensor modules or sensors), an inlet fitting 477, an outlet fitting 478, a tank 495, and a heating system 440. The heating system 440 can be any type of system using any type of technology to directly or indirectly apply heat to water within the tank 495 to generate heated water. For example, the heating system 440 can include a combustion heater 140 as referenced above. Alternatively, the heating system 440 can include a heat pump assembly and a resistive heating element (a type of supplemental heating source). In such a case, the heating system 440 can include one or more of a number of components, including but not limited to a compressor, an air moving device, an evaporator, and a coil, which can include an outflow portion and an inflow portion.

The heating system 440 does not run continuously. Under normal operations, the heating system 440 is turned on (e.g., by the controller 404, using its own local controller) when the temperature of the water within the tank 495 falls below a minimum temperature threshold value. When this occurs, the heating system 440 remains on (continues to operate) until the temperature of the water within the tank 495 reaches a maximum temperature threshold value, at which time the heating system 440 is turned off (e.g., by the controller 404, using its own local controller). This cycle in which the heating system 440 operates can be called a normal operating cycle herein. Using example embodiments, the heating system 440 is operated to remove condensation from the heat exchanger (e.g., multi-pass heat exchanger 260) at points in time outside the normal operating cycle, when the heating system 440 would otherwise be idle (off).

As shown in FIG. 4B, the controller 404 can include one or more of a number of components. Such components, can include, but are not limited to, a control engine 406, a communication module 408, a timer 410, an optional energy metering module 411, a power module 412, a storage repository 430, a hardware processor 420, a memory 422, a transceiver 424, an application interface 426, and, optionally, a security module 428. The components shown in FIGS. 4A and 4B are not exhaustive, and in some embodiments, one or more of the components shown in FIGS. 4A and 4B may not be included in an example system. Further, one or more components shown in FIGS. 4A and 4B can be rearranged. For example, some or all of the inlet line 407 can be part of the water heater 400. Any component of the example water heating system 499 can be discrete or combined with one or more other components of the water heating system 499.

A user 450 may be any person or entity that interacts with the water heater 400 and/or the controller 404. Examples of a user 450 may include, but are not limited to, an engineer, an appliance or process that uses heated water, an electrician, an instrumentation and controls technician, a mechanic, an operator, a consultant, an electric utility, a grid operator, a retail electric provider, an energy marketing company, load forecasting software, a weather forecasting service, a network manager, a labor scheduling system, a contractor, a homeowner, a landlord, a building management company, and a manufacturer's representative. There can be one or multiple users 450, and it should be understood that the user 450 is not a required aspect of the water heater 400.

The user 450 can use a user system (not shown), which may include a display (e.g., a GUI). The user 450 can interact with (e.g., sends data to, receives data from) the controller 404 via the application interface 426 (described below). The user 450 can also interact with the water heater 400 (including any components thereof, including one or more of the sensor devices 451) and/or the power supply 435. Interaction between the user 450, the controller 404, the water heater 400, and the power supply 435 is conducted using signal transfer links 405 and/or power transfer links 439.

Each signal transfer link 405 and each power transfer link 439 can include wired (e.g., Class 1 electrical cables, Class 2 electrical cables, electrical connectors, electrical conductors, electrical traces on a circuit board, power line carrier, DALI, RS485) and/or wireless (e.g., Wi-Fi, visible light communication, Zigbee, mobile apps, text/email messages, cellular networking, Bluetooth, WirelessHART, ISA100) technology. For example, a signal transfer link 405 can be (or include) one or more electrical conductors that are coupled to the controller 404 and to a sensor device 451 of the water heater 400. A signal transfer link 405 can transmit signals (e.g., communication signals, control signals, data) between the controller 404, the user 450, the water heater 400 (including components thereof), and/or the power supply 435.

Similarly, a power transfer link 439 can transmit power between the controller 404, the user 450, the water heater 400 (including components thereof), and/or the power supply 435. One or more signal transfer links 405 and/or one or more power transfer links 439 can also transmit signals and power, respectively, between components (e.g., temperature sensor 458-2, flow sensor 454-1) within the water heater 400 and/or within the controller 404.

The power supply 435 provides power, directly or indirectly, to one or more components (e.g., the sensor devices 451, the controller 404, the heating system 440) of the water heating system 499. The power supply 435 can include one or more components (e.g., a transformer, a fuse) that receives power (for example, through an electrical cable) from an independent power source external to the heating system 499 and generates power of a type (e.g., AC, DC) and level (e.g., 240V, 420V) that can be used by one or more components of the heating system 499. For example, the power supply 435 can provide 240V AC power. In addition, or in the alternative, the power supply 435 can be a source of power in itself. For example, the power supply 435 can be or include a battery, a localized photovoltaic power system, or some other source of independent power.

As stated above, the water heater 400 in this example includes a heating system 440, multiple sensor devices 451, an inlet fitting 477, an outlet fitting 478, a tank 495, and a heating system 440. The water heater 400 has an outer wall 491 that forms the tank 495. In some cases, there can be an inner wall (not shown), and in such a case insulation can be disposed between the wall 491 (in this case, an outer wall 491) and the inner wall to help the tank 495 to retain heat longer. The inlet fitting 477 can be coupled to the inlet line 407 at its outer end. The outlet fitting 488 can be coupled to the outlet line 409 at its outer end. In alternate examples, one or both of the inlet fitting 477 and the outlet fitting 488 are disposed at the top end of the water heater 400. In such alternate examples, there can also be a tube inside of the tank 495 that is coupled to the inner end of the inlet fitting 477.

The inlet line 407 can be a pipe or other vessel that delivers unheated water to the tank 495 of the water heater 400. The distal end of the inlet line 407 is coupled, directly or indirectly, to the outer end of the inlet fitting 477. As discussed above, the inner end of the inlet fitting 477 can be coupled to the proximal end of a another tube (which can be considered part of the inlet fitting 477), which can be disposed entirely within the tank 495 of the water heater 400. Such a tube can allow for the flow of unheated water into the tank 495 of the water heater 400. Alternatively, the inner end of the inlet fitting 477 can have no tube coupled to it. The wall 491 of the water heater 400 has an aperture in which the inlet fitting 477 can be disposed therein. The inlet fitting 477 in this case is positioned toward the bottom of the tank 495. This configuration allows unheated water to flow from an external source into the tank 495 of the water heater 400 without drastically reducing the temperature of the heated water already in the tank 495.

Similarly, the outlet line 409 can be a pipe or other vessel that can allow for the heated water in the tank 495 to flow out of the water heater 400. The outlet line 409 has a distal end that can be disposed at any point within the tank 495. Typically, as in this case, the distal end of the outlet line 409 is disposed near the top end of the tank 495. The wall 191 of the water heater 400 has an aperture in which the outlet fitting 478 can be disposed. A segment of the outlet line 409 can be coupled to the inner end of the outlet fitting 478, allowing that segment of the outlet line 409 to extend into the tank 495. The remainder of the outlet line 409 is coupled to the outer end of the outlet fitting 478. The outlet fitting 478 is positioned toward the top of the tank 495, where the heated water is sure to be disposed within the tank 495. This configuration allows heated water in the tank 495 to be drawn from the tank 495 of the water heater 400 so that the heated water can be delivered to one or more of a number of devices (e.g., clothes washer, dishwasher, faucets, shower heads) that use the heated water.

Each of the sensor devices 451 can measure one or more of a number of parameters. Examples of types of sensors 451 can include, but are not limited to, temperature sensor, a pressure sensor, a flow rate sensor, a moisture sensor, a scale, a voltmeter, an ammeter, a power meter, an ohmmeter, an electric power meter, and a resistance temperature detector. A sensor 451 can also include one or more components and/or devices (e.g., a potential transformer, a current transformer, electrical wiring, a transducer) related to the measurement of a parameter.

A parameter that can be measured by a sensor device 451 can include, but is not limited to, pressure, flow rate, current, voltage, power, resistance, moisture, relative humidity, weight, and temperature. In certain example embodiments, the parameter or parameters measured by a sensor device 451 can be used by the controller 404 to determine whether to turn on the heating system 440, even in the absence of a present demand for heated water from the tank 495. Each sensor device 451 can use one or more of a number of communication protocols (e.g., a type of protocol 432). A sensor device 451 can be a stand-alone device or integrated with another component (e.g., the heating system 440) in the system 499. A sensor device 451 can measure a parameter continuously, periodically, based on the occurrence of an event, based on a command received from the control module 406 of the controller 404, and/or based on some other factor.

In this example, there are three temperature sensors 458, at least one flow sensor 454, and a water leak sensor 459. The water leak sensor 459 is disposed toward the bottom end of the water heater 400 and detects a leak in the tank 495 of the water heater 400. The flow sensor 454-1 measures the rate of flow of unheated water in the inlet line 407 when entering the tank 495. Temperature sensor 458-1 is located toward the top end (e.g., approximately ¼ the height of the tank 495 from the top end of the tank 495) and measures the temperature of the water (e.g., heated water, unheated water, mixture of heated water and unheated water) in the tank 495 at that location. This temperature measured by temperature sensor 458-1 can be an indication of whether the heated water in the tank 495 has reached the set point of the water heater 400, which in turn determines whether the heating system 440 should remain on or be turned off (idle).

Temperature sensor 458-2 is located toward the bottom end (e.g., approximately ¼ the height of the tank 495 from the bottom end of the tank 495) and measures the temperature of the water (e.g., heated water, unheated water, mixture of heated water and unheated water) in the tank 495 at that point. Since heat rises, the temperature measured by temperature sensor 458-2 can be no greater than the temperature measured by the temperature sensor 458-1. If this event occurs, the controller 404 can determine that temperature sensor 458-1 and/or temperature sensor 458-2 are faulty and require maintenance and/or replacement. Temperature sensor 458-3 measures the temperature of the unheated water in the inlet line 407 before the unheated water flows into the tank 495. The controller 404 can use the measurements made by some or all of the foregoing sensors to determine whether an idle heating system 440 should be turned on to remove any condensation that may be accumulating in the heat exchanger (e.g., multi-pass heat exchanger 260).

The water heater 400 can also include one or more valves 452. In this example, the water heater 400 includes a valve 452-1 that controls the rate of flow (or the flow itself) of the unheated water in the inlet tube 407, as well as an optional valve 452-2 that controls the rate of flow (or the flow itself) of heated water in the outlet tube 409. In certain example embodiments, the position (e.g., fully open, fully closed, 30% open) of a valve 452 can be controlled by the controller 404. The water heater 400 can further include a switch 456 (also called, for example, an emergency cutout switch 456, a cutout switch 456, and an ECO 456) that controls the energy (e.g., electrical power, gas) delivered to the heating system 440. The switch 456 can have an open position (preventing energy from flowing to the heating system 440) and a closed position (allowing energy to flow to the heating system 440). The position and operation of the switch 456 can be independent of the controller 404.

The water heater 400 can also include a temperature and pressure relief valve 457 that is disposed in the top of the tank 495. The relief valve 457 can be a purely mechanical device (e.g., not controlled by the controller 404) that detects when the pressure and/or temperature within the tank 495 exceeds a threshold value for that parameter. If such an event were to occur, the relief valve 457 would operate from a normally-closed position to an open position.

If the relief valve 457 determines that the pressure within the tank 495 exceeds a maximum threshold value, then the relief valve 457 opens to allow the excess pressure to vent out the top of the water heater 400 into the ambient environment 419. When the pressure within the tank 495 measured by the relief valve 457 falls back within a safe range (another threshold value), then the relief valve 457 returns to the closed position. Similarly, if the relief valve 457 determines that the temperature within the tank 495 exceeds a maximum threshold value, then the relief valve 457 opens to allow the excess temperature to vent out the top of the water heater 400 into the ambient environment 419. When the temperature within the tank 495 measured by the relief valve 457 falls back within a safe range (another threshold value), then the relief valve 457 returns to the closed position.

The heating system 440 of FIG. 4A generates a heated fluid and sends the heated fluid (heat energy) through the heat exchanger (e.g., multi-pass heat exchanger 260). When this occurs, the heat energy from the heated fluid is transferred through the thermally-conductive tube segments of the heat exchanger to the water in the tank 495.

Those of ordinary skill in the art will appreciate that heating systems 440 for water heaters 400 can have any of a number of other configurations, using any of a number of technologies and/or components. In any case, the controller 404 is aware of the devices, components, ratings, positioning, and any other relevant information regarding the heating system 440 relative to the tank 495. In some cases, one or more devices of the heating system 440 can have its own local controller. In such a case, the controller 404 can communicate with a local controller of the heating system 440 using signal transfer links 405 and/or power transfer links 439.

The heating system 440, whether controlled by the controller 404, a user 450, or the heating system 440 itself, has a differential. The differential is the difference between the temperature at which the heating system 440 turns off and the temperature at which the heating system 440 subsequently turns back on. Differentials can be expressed in terms of degrees Fahrenheit or degrees Celsius. With many water heaters used in residential applications (lower capacity tanks 495), this differential is high (12° F. or more) and cannot be adjusted by a user 450. By contrast, many water heaters used in commercial applications (larger capacity tanks 495), the differential is low (8° F. or less) and can, in some cases, be adjusted within a range. In particular, high efficiency water heaters (such as the water heater 100 of FIGS. 1-3) can have a differential of about 4° F., and this differential can be adjusted by a user 450. Because of the configuration (e.g., the multi-pass heat exchanger 260) of many high-efficiency water heaters, when the differential is relatively low, there is a greater chance to condensation to accumulate in the heat exchanger to cause degradation of performance or failure of the water heater. Example embodiments are designed to reduce or eliminate the risk of this problem occurring.

The user 450, the power supply 435, and/or the water heater 400 (including the sensors 451 and a local controller, if any) can interact with the controller 404 using the application interface 426 in accordance with one or more example embodiments. Specifically, the application interface 426 of the controller 404 receives data (e.g., information, communications, instructions, updates to firmware) from and sends data (e.g., information, communications, instructions) to the user 450, the power supply 435, and/or the water heater 400. The user 450, the power supply 435, the controller 404, and/or the water heater 400 (including portions thereof) can include an interface to transfer data therebetween in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof. For example, referring to FIG. 5 below, the controller 404 can include a user interface having one or more of a number of I/O devices 516 (e.g., buzzer, alarm, indicating light, pushbutton).

The controller 404, the user 450, the power supply 435, and/or the water heater 400 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 404. Examples of such a system can include, but are not limited to, a desktop computer with Local Area Network (LAN), Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 5.

Further, as discussed above, such a system can have corresponding software (e.g., user software, sensor device software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the water heating system 499.

The controller 404 can be a stand-alone device or integrated with another component (e.g., the water heater 400)

in the water heating system 499. When the controller 404 is a stand-alone device, the controller 404 can include a housing. In such a case, the housing can include at least one wall that forms a cavity. In some cases, the housing can be designed to comply with any applicable standards so that the controller 404 can be located in a particular environment (e.g., a hazardous environment, a high temperature environment, a high humidity environment).

The housing of the controller 404 can be used to house one or more components of the controller 404. For example, the controller 404 (which in this case includes the control engine 406, the communication module 408, the timer 410, the optional energy metering module 411, the power module 412, the storage repository 430, the hardware processor 420, the memory 422, the transceiver 424, the application interface 426, and the optional security module 428) can be disposed in a cavity formed by a housing. In alternative embodiments, any one or more of these or other components of the controller 404 can be disposed on a housing and/or remotely from a housing.

The storage repository 430 can be a persistent storage device (or set of devices) that stores software and data used to assist the controller 404 in communicating with the user 450, the power supply 435, and water heater 400 (including components thereof) within the heating system 499. In one or more example embodiments, the storage repository 430 stores one or more protocols 432, algorithms 433, and stored data 434. The protocols 432 can be any procedures (e.g., a series of method steps) and/or other similar operational procedures that the control engine 406 of the controller 404 follows based on certain conditions at a point in time. The protocols 432 can include any of a number of communication protocols 432 that are used to send and/or receive data between the controller 404 and the user 450, the power supply 435, and the water heater 400.

A protocol 432 can be used for wired and/or wireless communication. Examples of a protocol 432 can include, but are not limited to, Econet, Modbus, profibus, Ethernet, and fiberoptic. One or more of the communication protocols 432 can be a time-synchronized protocol. Examples of such time-synchronized protocols can include, but are not limited to, a highway addressable remote transducer (HART) protocol, a wireless HART protocol, and an International Society of Automation (ISA) 100 protocol. In this way, one or more of the communication protocols 432 can provide a layer of security to the data transferred within the system 499.

The algorithms 433 can be any formulas, logic steps, mathematical models (e.g., load forecasting models, forward energy price model), and/or other suitable means of manipulating and/or processing data. One or more algorithms 433 can be used for a particular protocol 432. As discussed above, the controller 404 uses information (e.g., temperature measurements, flow rate measurements) provided by the sensor devices 451 to generate, using one or more protocols 432 and/or one or more algorithms 433, information related to whether condensation is accumulating in the heat exchanger (e.g., multi-pass heat exchanger 260) of the water heater 400.

For example, a protocol 432 and/or an algorithm 433 can dictate when a measurement is taken by a sensor device 451 and which particular sensor devices 451 take a measurement at that point in time. As another example, a protocol 432 and/or an algorithm 433 can be used, in conjunction with measurements made by one or more sensor devices 451, by the controller 404 to determine whether an idling heating system 440 should be cycled on for a period of time, even though there is no present demand for heated water and the temperature of the water within the tank 495 is within acceptable limits. As yet another example, a protocol 432 and/or an algorithm 433 can be used by the controller 404 to suspend and/or resume operation of the heating system 440 or portion thereof. Put another way, example embodiments can be used to prevent short cycling of the heating system 440.

Stored data 434 can be any data associated with the water heating system 499 (including any components thereof), any measurements taken by the sensor devices 451, time measured by the timer 410, adjustments to an algorithm 433, threshold values, user preferences, default values, results of previously run or calculated algorithms 433, and/or any other suitable data. Such data can be any type of data, including but not limited to historical data for the water heating system 499 (including any components thereof, such as the sensor devices 451 and the heating system 440), calculations, adjustments made to calculations based on actual data, and measurements taken by one or more sensor devices 451. The stored data 434 can be associated with some measurement of time derived, for example, from the timer 410.

Examples of a storage repository 430 can include, but are not limited to, a database (or a number of databases), a file system, a hard drive, flash memory, some other form of solid state data storage, or any suitable combination thereof. The storage repository 430 can be located on multiple physical machines, each storing all or a portion of the protocols 432, the algorithms 433, and/or the stored data 434 according to some example embodiments. Each storage unit or device can be physically located in the same or in a different geographic location.

The storage repository 430 can be operatively connected to the control engine 406. In one or more example embodiments, the control engine 406 includes functionality to communicate with the user 450, the power supply 435, and the water heater 400 (including components thereof) in the water heating system 499. More specifically, the control engine 406 sends information to and/or receives information from the storage repository 430 in order to communicate with the user 450, the power supply 435, and the water heater 400. As discussed below, the storage repository 430 can also be operatively connected to the communication module 408 in certain example embodiments.

In certain example embodiments, the control engine 406 of the controller 404 controls the operation of one or more components (e.g., the communication module 408, the timer 410, the transceiver 424) of the controller 404. For example, the control engine 406 can activate the communication module 408 when the communication module 408 is in "sleep" mode and when the communication module 408 is needed to send data received from another component (e.g., switch 456, a sensor 451, the user 450) in the water heating system 499.

As another example, the control engine 406 can acquire the current time using the timer 410. The timer 410 can enable the controller 404 to control the heating system 440 (including any components thereof). As yet another example, the control engine 406 can direct a sensor 451 to measure a parameter (e.g., temperature, flow rate) and send the measurement by reply to the control engine 406.

Figure 6:
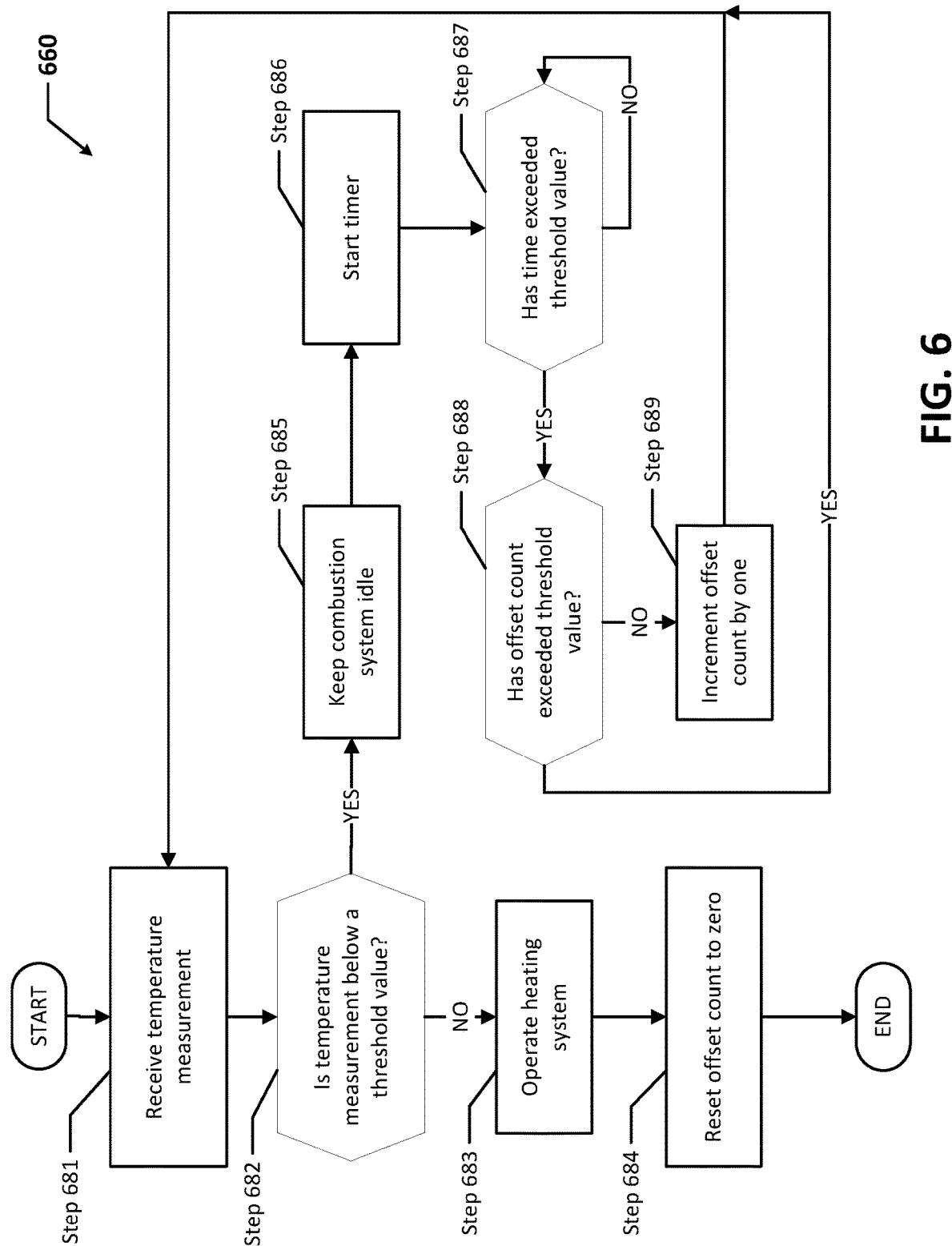
FIG. 6 shows a flowchart for reducing condensation in water heaters in accordance with certain example embodiments.

The control engine 406 can be configured to perform a number of functions that help the controller 404 make a determination as to when and how to control different components of the heating system 440 over time. For example, the control engine 406 can execute any of the protocols 432 and/or algorithms 433 stored in the storage repository 430 and use the results of those protocols 432 and/or algorithms 433 to operate the heating system 440 for a period of time to remove condensation that may be accumulating in the heat exchanger of the water heater 400. As another example, the control engine 406 can execute other protocols 432 and/or algorithms 433 and use the results of those protocols 432 and/or algorithms 433 to determine that there is no accumulation of condensation in the heat exchanger, and if the temperature of the water in the tank 495 is sufficiently high. In such a case, if the heating system 440 is operating, then the control engine 406 can execute other protocols 432 and/or algorithms 433 and use the results of those protocols 432 and/or algorithms 433 to idle the heating system 440 of the water heater 400. FIG. 6 below provides a more specific examples of how the control engine 406 functions according to certain example embodiments.

The control engine 406 can generate an alarm or some other form of communication when an operating parameter (e.g., level of condensation in the heat exchanger, temperature read by a temperature sensor 458) exceeds or falls below a threshold value (in other words, falls outside an acceptable range of values). The control engine 406 can also track measurements made by a sensor device 451 and determine a possible present or future failure of the sensor device 451 or some other component of the water heater 400 or, more generally, the water heating system 499.

In some cases, using one or more algorithms 433, the control engine 406 can predict the expected useful life of these components based on stored data 434, a protocol 432, one or more threshold values, and/or some other factor. The control engine 406 can also measure (using one or more sensors 451) and analyze the efficiency of the water heater 400 (or portion thereof) over time. An alarm can be generated by the control engine 406 when the efficiency of a component of the water heating system 499 falls below a threshold value, indicating failure or deterioration of that component.

The control engine 406 of the controller 404 can operate in one of any number of modes at a given time. Examples of such modes can include, but are not limited to, off, vacation mode, performance mode, energy saver mode, and sleep mode. The control engine 406 can operate in a particular mode based on one or more of a number of factors, including but not limited to input from a user 450, time, a parameter measured by a sensor device 451, and performance of a component of the heating system 440. Regardless of the mode of operation of the controller 404, the controller 404 is able to determine whether condensation may be accumulating in the heat exchanger (e.g., multi-pass heat exchanger 260) of the water heater 400 and operate the heating system 440 to remove the condensation from the heat exchanger.

As defined herein, determining that condensation has accumulated in the heat exchanger of the water heater 400 can be a perceived (and perhaps not actual) accumulation of condensation. For example, the controller 404 can determine that condensation has accumulated in the heat exchanger by using one or more of the algorithms 433 in conjunction with one or more indirect measurements made by one or more sensor devices 451 (e.g., temperature sensor 458). In such a case, the ultimate result of the one or more algorithms can be that condensation has, or may have, accumulated in the heat exchanger, even if no such accumulation of condensation has actually occurred. In other words, the controller 404 can operate the heating system 440 based on a calculation to determine whether condensation has accumulated in the heat exchanger, independent of whether condensation has, in fact, accumulated in the heat exchanger. In this way, example embodiments can be used to prevent the accumulation of condensation in the heat exchanger, regardless of whether condensation has actually accumulated or even exists in the heat exchanger.

The control engine 406 can perform its evaluation functions and resulting actions on a continuous basis, periodically, during certain time intervals, or randomly. Further, the control engine 406 can perform this evaluation for the present time or for a period of time in the future. For example, the control engine 406 can perform forecasts to determine whether condensation is likely to accumulate when the heating system 440 is idled at some point in time in the future. The control engine 406 can adjust a forecast (e.g., every hour, when new information from a user 450 or a sensor device 451 is received), just as the control engine 406 can automatically adjust an algorithm and/or a protocol to provide a more accurate determination of whether condensation is accumulating in the heat exchanger and how to most effectively and efficiently eliminate such condensation.

The control engine 406 can provide power, control, communication, and/or other similar signals to the user 450, the power supply 435, and the water heater 400 (including components thereof). Similarly, the control engine 406 can receive power, control, communication, and/or other similar signals from the user 450, the power supply 435, and the water heater 400. The control engine 406 can control each sensor 451, valve 452, and/or other component in the water heating system 499 automatically (for example, based on one or more algorithms 433 stored in the storage repository 430) and/or based on power, control, communication, and/or other similar signals received from another device through a signal transfer link 405 and/or a power transfer link 439. The control engine 406 may include a printed circuit board, upon which the hardware processor 420 and/or one or more discrete components of the controller 404 are positioned.

In certain embodiments, the control engine 406 of the controller 404 can communicate with one or more components (e.g., a network manager) of a system external to the water heating system 499. For example, the control engine 406 can interact with an inventory management system by ordering a component (e.g., a sensor device 451) to replace a sensor device 451 (e.g., temperature sensor 458-3) that the control engine 406 has determined has failed or is failing. As another example, the control engine 406 can interact with a workforce scheduling system by scheduling a maintenance crew to repair or replace a component of the water heating system 499 when the control engine 406 determines that the component requires maintenance or replacement. In this way, the controller 404 is capable of performing a number of functions beyond what could reasonably be considered a routine task.

In certain example embodiments, the control engine 406 can include an interface that enables the control engine 406 to communicate with one or more components (e.g., a user 450, a switch 456) of the water heating system 499. For example, if a user 450 operates under IEC Standard 62386, then the user 450 can have a serial communication interface that will transfer data (e.g., stored data 434) measured by the sensors 451. In such a case, the control engine 406 can also include a serial interface to enable communication with the user 450. Such an interface can operate in conjunction with, or independently of, the protocols 432 used to communicate between the controller 404 and the user 450, the power supply 435, and the water heater 400 (or components thereof).

The control engine 406 (or other components of the controller 404) can also include one or more hardware components (e.g., peripherals) and/or software elements to perform its functions. Such components can include, but are not limited to, a universal asynchronous receiver/transmitter (UART), a serial peripheral interface (SPI), an analog-to-digital converter, an inter-integrated circuit (I²C), and a pulse width modulator (PWM).

The communication module 408 of the controller 404 determines and implements the communication protocol (e.g., from the protocols 432 of the storage repository 430) that is used when the control engine 406 communicates with (e.g., sends signals to, receives signals from) the user 450, the power supply 435, and the water heater 400 (or components thereof). In some cases, the communication module 408 accesses the stored data 434 to determine which communication protocol is used to communicate with a sensor 451 associated with certain stored data 434. In addition, the communication module 408 can interpret the communication protocol of a communication received by the controller 404 so that the control engine 406 can interpret the communication.

The communication module 408 can send and receive data between the power supply 435, the water heater 400 (or components thereof), and/or the users 450 and the controller 404. The communication module 408 can send and/or receive data in a given format that follows a particular protocol 432. The control engine 406 can interpret the data packet received from the communication module 408 using the protocol 432 information stored in the storage repository 430. The control engine 406 can also facilitate the data transfer between the water heater (or components thereof), the power supply 435, and a user 450 by converting the data into a format understood by the communication module 408.

The communication module 408 can send data (e.g., protocols 432, algorithms 433, stored data 434, operational information, alarms) directly to and/or retrieve data directly from the storage repository 430. Alternatively, the control engine 406 can facilitate the transfer of data between the communication module 408 and the storage repository 430. The communication module 408 can also provide encryption to data that is sent by the controller 404 and decryption to data that is received by the controller 404. The communication module 408 can also provide one or more of a number of other services with respect to data sent from and received by the controller 404. Such services can include, but are not limited to, data packet routing information and procedures to follow in the event of data interruption.

The timer 410 of the controller 404 can track clock time, intervals of time, an amount of time, and/or any other measure of time. The timer 410 can also count the number of occurrences of an event, whether with or without respect to time. Alternatively, the control engine 406 can perform the counting function. The timer 410 is able to track multiple time measurements concurrently. The timer 410 can track time periods based on an instruction received from the control engine 406, based on an instruction received from the user 450, based on an instruction programmed in the software for the controller 404, based on some other condition or from some other component, or from any combination thereof.

The timer 410 can be configured to track time when there is no power delivered to the controller 404 (e.g., the power module 412 malfunctions) using, for example, a super capacitor or a battery backup. In such a case, when there is a resumption of power delivery to the controller 404, the timer 410 can communicate any aspect of time to the controller 404. In such a case, the timer 410 can include one or more of a number of components (e.g., a super capacitor, an integrated circuit) to perform these functions.

The power module 412 of the controller 404 provides power to one or more other components (e.g., timer 410, control engine 406) of the controller 404. In addition, in certain example embodiments, the power module 412 can provide power to one or more components (e.g., the heating system 440, the switch 456, a valve 452) of the water heating system 499. The power module 412 can include one or more of a number of single or multiple discrete components (e.g., transistor, diode, resistor), and/or a microprocessor. The power module 412 may include a printed circuit board, upon which the microprocessor and/or one or more discrete components are positioned. In some cases, the power module 412 can include one or more components that allow the power module 412 to measure one or more elements of power (e.g., voltage, current) that is delivered to and/or sent from the power module 412. Alternatively, the controller 404 can include a power metering module (not shown) to measure one or more elements of power that flows into, out of, and/or within the controller 404.

The power module 412 can include one or more components (e.g., a transformer, a diode bridge, an inverter, a converter) that receives power (for example, through an electrical cable) from the power supply 435 and generates power of a type (e.g., AC, DC) and level (e.g., 12V, 24V, 120V) that can be used by the other components of the controller 404 and/or by the water heater 400. For example, 240VAC received from the power supply 435 by the power module 412 can be converted to 12VDC by the power module 412. The power module 412 can use a closed control loop to maintain a preconfigured voltage or current with a tight tolerance at the output. The power module 412 can also protect the remainder of the electronics (e.g., hardware processor 420, transceiver 424) in the controller 404 from surges generated in the line.

In addition, or in the alternative, the power module 412 can be a source of power in itself to provide signals to the other components of the controller 404. For example, the power module 412 can be a battery. As another example, the power module 412 can be a localized photovoltaic power system. In certain example embodiments, the power module 412 of the controller 404 can also provide power and/or control signals, directly or indirectly, to one or more of the sensor devices 451. In such a case, the control engine 406 can direct the power generated by the power module 412 to one or more of the sensor devices 451. In this way, power can be conserved by sending power to the sensor devices 451 when those devices need power, as determined by the control engine 406.

The optional energy metering module 411 of the controller 404 can measure one or more components of power (e.g., current, voltage, resistance, VARs, watts) at one or more points (e.g., output of the power supply 435) associated with the water heating system 499. The energy metering module 411 can include any of a number of measuring devices and related devices, including but not limited to a voltmeter, an ammeter, a power meter, an ohmmeter, a current transformer, a potential transformer, and electrical wiring. The energy metering module 411 can measure a component of power continuously, periodically, based on the occurrence of an event, based on a command received from the control module 406, and/or based on some other factor. If there is no energy metering module 411, then the controller 404 can estimate one or more components of power using one or more algorithms 433.

The hardware processor 420 of the controller 404 executes software, algorithms 433, and firmware in accordance with one or more example embodiments. Specifically, the hardware processor 420 can execute software on the control engine 406 or any other portion of the controller 404, as well as software used by the user 450, the power supply 435, and the water heater 400 (or portions thereof). The hardware processor 420 can be an integrated circuit, a central processing unit, a multi-core processing chip, SoC, a multi-chip module including multiple multi-core processing chips, or other hardware processor in one or more example embodiments. The hardware processor 420 is known by other names, including but not limited to a computer processor, a microprocessor, and a multi-core processor.

In one or more example embodiments, the hardware processor 420 executes software instructions stored in memory 422. The memory 422 includes one or more cache memories, main memory, and/or any other suitable type of memory. The memory 422 can include volatile and/or non-volatile memory. The memory 422 is discretely located within the controller 404 relative to the hardware processor 420 according to some example embodiments. In certain configurations, the memory 422 can be integrated with the hardware processor 420.

In certain example embodiments, the controller 404 does not include a hardware processor 420. In such a case, the controller 404 can include, as an example, one or more field programmable gate arrays (FPGA), one or more insulated-gate bipolar transistors (IGBTs), and one or more integrated circuits (ICs). Using FPGAs, IGBTs, ICs, and/or other similar devices known in the art allows the controller 404 (or portions thereof) to be programmable and function according to certain logic rules and thresholds without the use of a hardware processor. Alternatively, FPGAs, IGBTs, ICs, and/or similar devices can be used in conjunction with one or more hardware processors 420.

The transceiver 424 of the controller 404 can send and/or receive control and/or communication signals. Specifically, the transceiver 424 can be used to transfer data between the controller 404 and the user 450, the power supply 435, and the water heater 400 (or portions thereof). The transceiver 424 can use wired and/or wireless technology. The transceiver 424 can be configured in such a way that the control and/or communication signals sent and/or received by the transceiver 424 can be received and/or sent by another transceiver that is part of the user 450, the power supply 435, and the water heater 400 (or portions thereof). The transceiver 424 can use any of a number of signal types, including but not limited to radio frequency signals.

When the transceiver 424 uses wireless technology, any type of wireless technology can be used by the transceiver 424 in sending and receiving signals. Such wireless technology can include, but is not limited to, Wi-Fi, visible light communication, Zigbee, mobile apps, text/email messages, cellular networking, Bluetooth, and Bluetooth Low Energy (BLE). The transceiver 424 can use one or more of any number of suitable communication protocols (e.g., ISA100, HART) when sending and/or receiving signals. Such communication protocols can be stored in the communication protocols 432 of the storage repository 430. Further, any transceiver information for the user 450, the power supply 435, and the water heater 400 (or portions thereof) can be part of the stored data 434 (or similar areas) of the storage repository 430.

Optionally, in one or more example embodiments, the security module 428 secures interactions between the controller 404, the user 450, the power supply 435, and the water heater 400 (or portions thereof). More specifically, the security module 428 authenticates communication from software based on security keys verifying the identity of the source of the communication. For example, user software may be associated with a security key enabling the software of the user 450 to interact with the controller 404 and/or the sensors 451. Further, the security module 428 can restrict receipt of information, requests for information, and/or access to information in some example embodiments.

Figure 5:
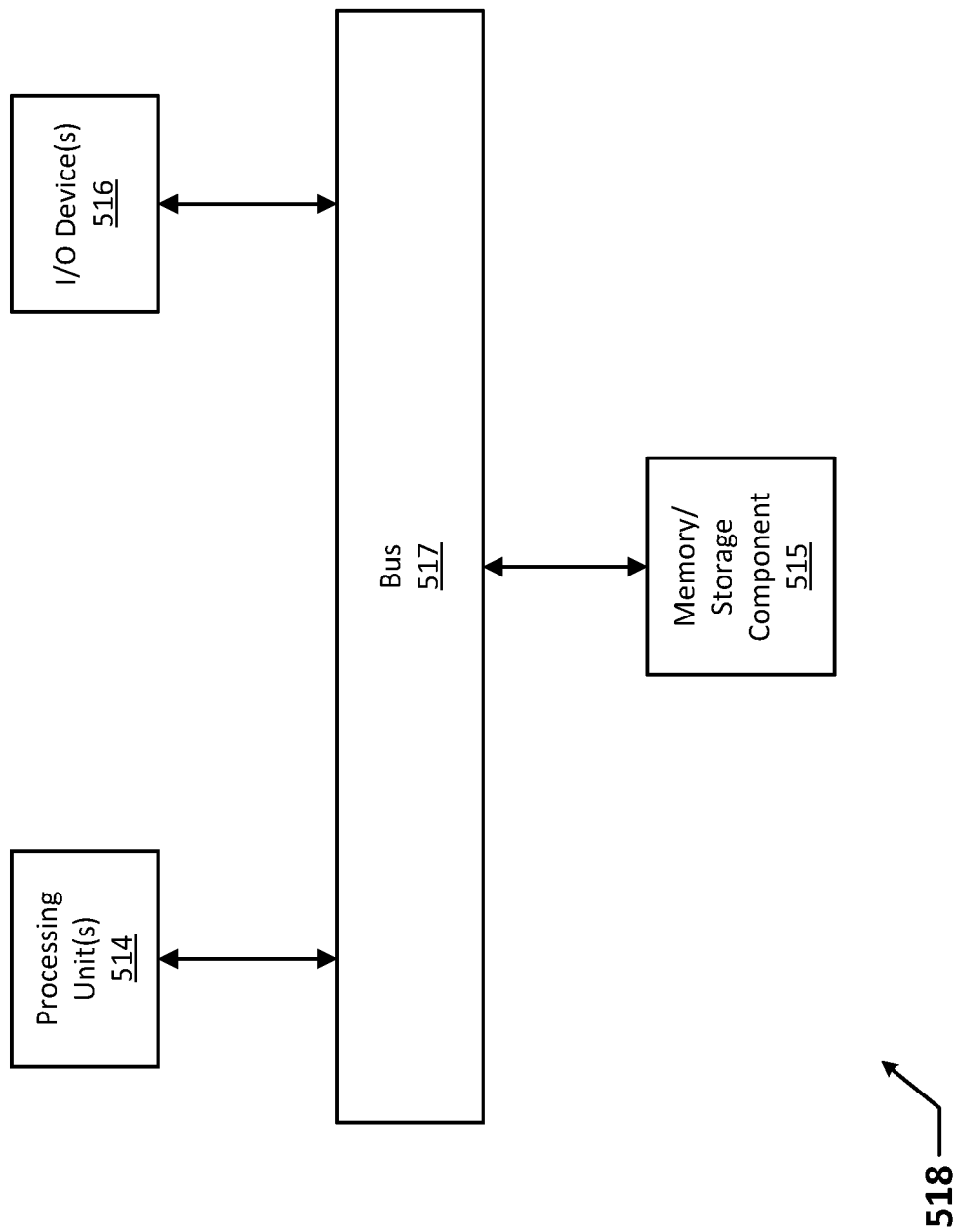
FIG. 5 shows a computing device in accordance with certain example embodiments.

FIG. 5 illustrates one embodiment of a computing device 518 that implements one or more of the various techniques described herein, and which is representative, in whole or in part, of the elements described herein pursuant to certain example embodiments. Computing device 518 is one example of a computing device and is not intended to suggest any limitation as to scope of use or functionality of the computing device and/or its possible architectures. Neither should computing device 518 be interpreted as having any dependency or requirement relating to any one or combination of components illustrated in the example computing device 518.

Computing device 518 includes one or more processors or processing units 514, one or more memory/storage components 515, one or more input/output (I/O) devices 516, and a bus 517 that allows the various components and devices to communicate with one another. Bus 517 represents one or more of any of several types of bus structures, including a memory bus or memory controller, a peripheral bus, an accelerated graphics port, and a processor or local bus using any of a variety of bus architectures. Bus 517 includes wired and/or wireless buses.

Memory/storage component 515 represents one or more computer storage media. Memory/storage component 515 includes volatile media (such as random access memory (RAM)) and/or nonvolatile media (such as read only memory (ROM), flash memory, optical disks, magnetic disks, and so forth). Memory/storage component 515 includes fixed media (e.g., RAM, ROM, a fixed hard drive, etc.) as well as removable media (e.g., a flash memory drive, a removable hard drive, an optical disk, and so forth).

One or more I/O devices 516 allow a customer, utility, or other user to enter commands and information to computing device 518, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 518 is connected to a network (not shown) (e.g., a LAN, a WAN such as the Internet, cloud, or any other similar type of network) via a network interface connection (not shown) according to some example embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other example embodiments. Generally speaking, the computer system 518 includes at least the minimal processing, input, and/or output means necessary to practice one or more embodiments.

Further, those skilled in the art will appreciate that one or more elements of the aforementioned computer device 518 can be located at a remote location and connected to the other elements over a network in certain example embodiments. Further, one or more embodiments is implemented on a distributed system having one or more nodes, where each portion of the implementation (e.g., control engine 406) is located on a different node within the distributed system. In one or more embodiments, the node corresponds to a computer system. Alternatively, the node corresponds to a processor with associated physical memory in some example embodiments. The node alternatively corresponds to a processor with shared memory and/or resources in some example embodiments.

FIG. 6 shows a flowchart of a method 660 for removing condensation from a heat exchanger of a water heater in accordance with certain example embodiments. As described herein, removing condensation can be removal of condensation that has actually accumulated in the heat exchanger or removal of anticipated condensation (based on one or more sensor measurements used in one or more algorithms) that may or may not exist in the heat exchanger at the time. While the various steps in this flowchart are presented and described sequentially, one of ordinary skill in the art will appreciate that some or all of the steps can be executed in different orders, combined or omitted, and some or all of the steps can be executed in parallel depending upon the example embodiment. Further, in one or more of the example embodiments, one or more of the steps described below can be omitted, repeated, and/or performed in a different order. For example, the process of removing condensation from a heat exchanger 260 of a water heater 400 can be a continuous process, and so the START and END steps shown in FIG. 6 can merely denote the start and end of a particular series of steps within a continuous process.

In addition, a person of ordinary skill in the art will appreciate that additional steps not shown in FIG. 6 can be included in performing this method 660 in certain example embodiments. Accordingly, the specific arrangement of steps should not be construed as limiting the scope. In addition, a particular computing device, as described, for example, in FIG. 5 above, is used to perform one or more of the steps for the method 660 described below in certain example embodiments. For the method 660 described below, unless specifically stated otherwise, a description of the controller 404 performing certain functions can be applied to the control engine 406 of the controller 404.

For clarity, the controller 404 described herein can control other aspects of the system 499 while performing the functions described above and in the method 660 of FIG. 6 below. For example, the controller 404 can control the one or more valves 452 (e.g., valve 452-1) independently of, or in conjunction with, the functions described herein. Further, the controller 404 can control the heating system 440 independently of, or in conjunction with, other components of the system 499. For example, a user 450 can adjust a setpoint, and the controller 404 can control the heating system 440 (and thus remove condensation from a heat exchanger 260 of a water heater 400) based on the new setpoint.

Referring to FIGS. 1-6, the example method 660 of FIG. 6 begins at the START step, where the heating system 440 of the water heater 400 is idle. The START step can begin once the heating system 440 becomes idle after running for some period of time. Alternatively, the heating system 440 can be idle for some period of time (as measured by the timer 410), at which point the START step of the example method 660 is initiated.

After the START step, the process proceeds to step 681, where a temperature measurement is received. The temperature measurement can be received by the controller 404. The temperature measurement can be for a temperature of water in the tank 495. The temperature measurement can be taken by a sensor 451 (e.g., temperature sensor 458-1, temperature sensor 458-2). The temperature measurement can be a single measurement at a single location within the tank 495, multiple measurements taken at the same time in different locations within the tank 495, multiple measurements taken over time for the same location within the tank 495, or multiple measurements taken over time for multiple locations within the tank 495.

In step 682, a determination is made as to whether the temperature measurement is below a threshold value. The determination can be made by the control engine 406. The threshold value can be a default value, a value determined by a user 450, a value that results from use of an algorithm 433, or a value that results from any other suitable means or component. When the threshold value results from use of an algorithm 433, one or more factors can be used in the algorithm 433 to determine the threshold value. Examples of such factors can include, but are not limited to, the setpoint of the water heater 400, a differential (e.g., a difference in readings between temperature sensors 458, a difference between the temperature at which the heating system 440 turns off and the temperature at which the heating system 440 turns on), and an amount of humidity measured by a sensor device 451.

As a specific example, the threshold value can be calculated using the following algorithm 433: Threshold value=Setpoint value less the differential less an offset. The setpoint value is a temperature value of the heated water that is set, for example, by a user 450. The setpoint value is the desired temperature of the heated water that leaves the tank 495 (through the outlet tube 409) for use by the user 450. The differential is the difference between the temperature at which the heating system 440 turns off and the temperature at which the heating system 440 subsequently turns back on. The offset is a variable artificial value that, in this case, increments based on the passage of time during an assessment period. More details of the offset value are provided below.

Regardless of what the threshold value is or how it is determined, the threshold value is an indication as to whether condensation is accumulating in the heat exchanger (e.g., heat exchanger 260). If the temperature measurement is below the threshold value, then there is no indication that condensation is accumulating in the heat exchanger, and the process proceeds to step 685. If the temperature measurement is not below (is equal to or greater than) the threshold value, then there is an indication that condensation is, or may be, accumulating in the heat exchanger, and the process proceeds to step 683.

In step 683, the heating system 440 is operated. The control engine 406 initiates operation of the heating system 440. When the heating system 400 operates, condensation that has or may have accumulated in the heat exchanger can be reduced or eliminated. In step 684, the offset count is reset to zero. When step 684 is complete, the process proceeds to the END step.

In step 685, the heating system 440 is kept idle. In other words, the control engine 406 takes no action to start the heating system 440 because the control engine 406 has determined that, at that point in time, there is not an actual or theoretical accumulation of condensation in the heat exchanger 260. This step can occur when there is no other reason to activate the heating system 440, such as a measured temperature of water in the tank 495 falling below the turn-on temperature threshold to turn on the heating system 440.

In step 686, the timer 410 is started. The timer 410 can be started by the control engine 406. Starting the timer 410 can mark the start of a time period (e.g., 5 minutes, 30 minutes) that the timer 410 tracks. In some cases, the control engine 406 determines whether the timer 410 has already been started at the beginning of step 686. In such a case, if the timer 410 already has been started when step 686 begins, then the timer 410 can be restarted by the control engine 406, or the timer 410 can continue to run without interference from the control engine 406.

In step 687, a determination is made as to whether the time tracked by the timer 410 has exceeded a threshold value. This determination can be made by the control engine 406. The threshold value can be a default value, a value selected by a user 450, a value based on a protocol 432 and/or an algorithm 433, or a value based on some other factor. The threshold value can be stored data 434 stored in the storage repository 430. A non-exclusive example of a threshold value is 30 minutes. If the time tracked by the timer 410 has exceeded the threshold value, then the process proceeds to step 688. If the time tracked by the timer 410 has not exceeded the threshold value, then the process reverts back to step 687 in a closed loop until the timer 410 has exceeded the threshold value.

In step 688, a determination is made as to whether the offset count has exceeded a threshold value. This determination can be made by the control engine 406. The offset is described above with respect to step 682. The count of the offset can be tracked by the control engine 406. The threshold value can be a default value, a value selected by a user 450, a value based on a protocol 432 and/or an algorithm 433, or a value based on some other factor. A non-exclusive example of a threshold value can be 8. The threshold value can be stored data 434 stored in the storage repository 430. If the offset count has exceeded the threshold value, then the process reverts to step 681. If the offset count has not exceeded the threshold value, then the process proceeds to step 689.

In step 689, the offset count is incremented by one. The offset count can be incremented by one by the control engine 406. When step 689 is complete, the process reverts to step 681. If the heating system 440 is initiated at some point during the method 660 of FIG. 6, independent of the steps of the method 660, then the method 660 can be stopped until the heating system 440 is once again made idle, in which case, the method 660 can again begin at the START step.

Example embodiments can be used to reduce or eliminate the amount of condensation that can form and accumulate within the heat exchanger of a water heater. The reduction or elimination of condensation in the heat exchanger can be achieved using one or more sensor devices, following one or more protocols, and using one or more algorithms. Example embodiments can be implemented in real time. Example embodiments can also lower costs, increase availability, increase efficiency, and increase the useful life of a water heater, including its various components. Example embodiments can also increase the satisfaction of a user by providing an efficient and reliable water heater, particularly with high-efficiency water heaters.

Although embodiments described herein are made with reference to example embodiments, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:
1. A water heater comprising:
  a tank;
  a water inlet line that delivers unheated water to the tank;
  a water outlet line that draws heated water from the tank for a hot water demand;
  a heat exchanger comprising a plurality of flue tube segments disposed within the tank, wherein the plurality of flue tube segments comprises a thermally-conductive material;
  a heating system that heats a fluid to create a heated fluid, wherein the heating system further circulates the heated fluid through the heat exchanger, wherein the plurality of flue tube segments of the heat exchanger absorb thermal energy from the heated fluid and subsequently dissipate the thermal energy into the tank to convert the unheated water to the heated water; and
  a controller coupled to the heating system, wherein the controller is configured to:
    determine a temperature of water within the tank;
    compare the temperature of water within the tank with a threshold value, the threshold value being based at least in part on an offset value, the offset value incrementally increasing upon a passing of a predetermined period of time; and
    if the temperature of water is greater than or equal to the threshold value, operate the heating system outside of a normal heating cycle, wherein operating the heating system outside of the normal heating cycle reduces the condensation; and reset the offset value to zero.

2. The water heater of claim 1, wherein the fluid is natural gas.

3. The water heater of claim 1, further comprising:
a temperature sensor that determines the temperature of water within the tank,
wherein the controller is further coupled to the temperature sensor.

4. The water heater of claim 1, wherein the controller further operates the heating system outside of the normal heating cycle based on a set point for the heating system.

5. The water heater of claim 4, wherein the controller further operates the heating system outside of the normal heating cycle based on a first difference between the set point for the heating system and a differential, wherein the differential is a second difference between a turn-off temperature and a turn-on temperature for the heating system during the normal heating cycle.

6. The water heater of claim 5, wherein the differential is less than 8° F.

7. The water heater of claim 5, wherein the differential is adjustable by a user.

8. The water heater of claim 1, wherein the controller uses an algorithm to operate the heating system outside of the normal heating cycle, wherein the algorithm establishes and increments the offset to determine when to operate the heating system outside of the normal heating cycle.

9. The water heater of claim 1, wherein the plurality of flue tube segments form a multi-pass configuration within the tank of the water heater.

\* \* \* \* \*